US010862876B2

(12) United States Patent
Ro et al.

(10) Patent No.: US 10,862,876 B2
(45) Date of Patent: Dec. 8, 2020

(54) DEVICE FOR ENCRYPTING AND/OR DECRYPTING PACKETS AND METHOD FOR ROUTING PACKETS IN MEMORY NETWORK INCLUDING THE SAME

(71) Applicants: SK hynix Inc., Icheon (KR); Korea Advanced Institute of Science and Technology, Daejeon (KR)

(72) Inventors: Yeonju Ro, Daegu (KR); Seongwook Jin, Seoul (KR); Jaehyuk Huh, Daejeon (KR); John Dongjun Kim, Seoul (KR)

(73) Assignees: SK hynix Inc., Icheon (KR); Korea Advanced Institute of Science and Technology, Daejeon (KR)

( * ) Notice: Subject to any disclaimer, the term of this patent is extended or adjusted under 35 U.S.C. 154(b) by 211 days.

(21) Appl. No.: 15/704,601

(22) Filed: Sep. 14, 2017

(65) Prior Publication Data

US 2018/0176202 A1 Jun. 21, 2018

(30) Foreign Application Priority Data

Dec. 20, 2016 (KR) ........................ 10-2016-0174225

(51) Int. Cl.
*H04L 9/32* (2006.01)
*H04L 29/06* (2006.01)
(Continued)

(52) U.S. Cl.
CPC .......... *H04L 63/067* (2013.01); *H04L 9/0863* (2013.01); *H04L 9/3228* (2013.01); *H04L 63/0428* (2013.01); *H04W 12/04* (2013.01)

(58) Field of Classification Search
CPC ..... H04L 63/067; H04L 9/0863; H04W 12/04
(Continued)

(56) References Cited

U.S. PATENT DOCUMENTS 8,549,092 B2 10/2013 Resnick
2007/0130472 A1* 6/2007 Buer ................. H04L 63/0428
713/182
(Continued)

FOREIGN PATENT DOCUMENTS

KR 10-2015-0028520 A 3/2015
KR 10-1630583 B1 6/2016

OTHER PUBLICATIONS

Claudio Brunelli, Adaptive Routing, 2006, Tamper University of Technology, pp. 203-219.*
(Continued)

*Primary Examiner* — Wasika Nipa
*Assistant Examiner* — Samuel Ambaye

(57) ABSTRACT

A device transmits or receives a packet in a memory network including one or more processors and/or one or more memory devices. The device includes a key storage unit configured to store a one-time password (OTP) key that is shared with a target node, an encryption unit configured to encrypt a transmission packet with the OTP key stored in the key storage unit and to transmit the encrypted transmission packet to the target node, and a decryption unit configured to decrypt a receiving packet from the target node with the OTP key stored in the key storage unit. The device is a processor or a memory device in the memory network.

20 Claims, 14 Drawing Sheets

| cmd | addr | data | | dest | R/W | etc | payload(addr, data) |
|---|---|---|---|---|---|---|---|
|  Plain |  Encrypted | | | |  Encrypted | | |
| <Prior Art> | | | | <Prior Art> | | | |

(51) Int. Cl.
*H04L 9/08* (2006.01)
*H04W 12/04* (2009.01)

(58) Field of Classification Search
USPC ......................................................... 713/168
See application file for complete search history.

(56) References Cited

U.S. PATENT DOCUMENTS

| | | | | |
|---|---|---|---|---|
| 2008/0095360 | A1* | 4/2008 | Vuillaume | H04L 9/3236 380/44 |
| 2010/0238944 | A1* | 9/2010 | Ajima | G06F 15/17368 370/401 |
| 2012/0250863 | A1* | 10/2012 | Bukshpun | H04L 9/14 380/278 |
| 2013/0151757 | A1* | 6/2013 | Hong Beom | G06F 13/1668 711/103 |
| 2014/0181458 | A1 | 6/2014 | Loh et al. | |
| 2016/0065378 | A1* | 3/2016 | Kim | H04L 9/0866 713/184 |

OTHER PUBLICATIONS

Claudio Brunelli, Adaptive Routing, 2006, Tamper University of Technology, pp. 203-219 (Year: 2006).*

Richard Chow et al., "Controlling Data in the Cloud: Outsourcing Computation without Outsourcing Control," 2009 ACM Workshop on Cloud Computing Security, CCSW '09, Nov. 13, 2009, pp. 85-90, ACM, USA.

J. Alex Halderman et al., "Lest We Remember: Cold Boot Attacks on Encryption Keys," 17th USENIX Security Symposium, May 2009, pp. 45-60, vol. 52, USENIX Association.

Tilo Müller et al., "TRESOR Runs Encryption Securely Outside RAM," Proceedings of the 20th USENIX Conference on Security, SEC'11, 2011, pp. 1-16, USENIX Association, Berkeley, CA, USA.

Andrew Huang, "Keeping secrets in hardware: The microsoft xbox™ case study," Cryptographic Hardware and Embedded Systems (CHES), vol. 2523 of Lecture Notes in Computer Science, May 26, 2002, pp. 1-15, Springer Berlin Heidelberg.

Erik-Oliver Blass et al., "TRESOR-HUNT: Attacking CPU-bound encryption," Proceedings of the 28th Annual Computer Security Applications Conference, ACSAC '12, Dec. 3-7, 2012, pp. 71-78, ACM, New York, NY, USA.

G. Edward Suh et al., "AEGIS: A Single-Chip Secure Processor," IEEE Design and Test Computers, 2007, pp. 570-580, vol. 8, IEEE.

David Lie et al., "Architectural support for copy and tamper resistant software," Proceedings of the Ninth International Conference on Architectural Support for Programming Languages and Operating Systems, ASPLOS IX, 2000, pp. 168-177, ACM, New York, NY, USA.

Amit Vasudevan et al., "CARMA: A hardware tamper-resistant isolated execution environment on commodity x86 platforms," Proceedings of the 7th ACMSymposium on Information, Computer and Communications Security,ASIACCS '12, 2012, pp. 48-49, ACM, New York, NY, USA.

Martin Maas et al., "PHANTOM: Practical oblivious computation in a secure processor," Proceedings of the 2013 ACM SIGSAC Conference on Computer & Communications Security, CCS'13, 2013, pp. 311-324, ACM, New York, NY, USA.

Xiaotong Zhuang et al., "HIDE: An infrastructure for efficiently protecting information leakage on the address bus," Proceedings of the 11th International Conference on Architectural Support for Programming Languages and Operating Systems, ASPLOS XI, 2004, pp. 72-84, New York, NY, USA.

Oded Goldreich, "Towards a theory of software protection and simulation by oblivious rams," Proceedings of the Nineteenth Annual ACM Symposium on Theory of Computing, STOC '87, 1987, pp. 182-194, ACM, New York, NY, USA.

Emil Stefanov et al., "Path ORAM: An extremely simple oblivious RAM protocol," Proceedings of the 2013 ACM SIGSAC Conference on Computer & Communications Security, CCS '13, 2013, pp. 299-310, ACM, New York, NY, USA.

Christopher W. Fletcher et al., "Freecursive ORAM: [nearly] free recursion and integrity verification for position-based oblivious RAM," Proceedings of the Twentieth International Conference on Architectural Support for Programming Languages and Operating Systems, ASPLOS '15, 2015, pp. 103-116, ACM, New York, NY, USA.

Chang Liu et al., "Ghostrider: A hardware-software system for memory trace oblivious computation," Proceedings of the Twentieth International Conference on Architectural Support for Programming Languages and Operating Systems, ASPLOS '15, 2015, pp. 87-101, ACM, New York, NY, USA.

J. Thomas Pawlowski, "Hybrid memory cube (hmc)," Hot Chips: A Symposium on High Performance Chips, Aug. 4, 2011, pp. 1-24, Micron Technology, Inc., Stanford, CA, USA.

"Gen-Z Consortium," 2016. http://genzconsortium.org/.

Gwangsun Kim et al., "Memory-centric system interconnect design with hybrid memory cubes," 2013 22nd International Conference on in Parallel Architectures and Compilation Techniques (PACT), 2013, pp. 145-156, Edinburgh, Scotland, UK.

"Hybrid Memory Cube Specification 1.0." Hybrid Memory Cube Consortium, 2013, pp. 1-60, part one of two.

"Hybrid Memory Cube Specification 1.0." Hybrid Memory Cube Consortium, 2013, pp. 61-121, part two of two.

Christopher Fletcher et al., "A secure processor architecture for encrypted computation on untrusted programs," Proceedings of the Seventh ACM Workshop on Scalable Trusted Computing, STC '12, 2012, pp. 3-8, ACM, New York, NY, USA.

Ling Ren et al., "Design space exploration and optimization of path oblivious ram in secure processors," Proceedings of the 40th Annual International Symposium on Computer Architecture, ISCA '13, 2013, pp. 571-582, ACM, New York, NY, USA.

W. Dally et al., "Principles and Practices of Interconnection Networks; Chapter 11: Routing Mechanics", 2003, pp. 203-219, Morgan Kaufmann Publishers Inc, San Francisco, CA, USA.

Christopher W. Fletcher et al., "Suppressing the oblivious ram timing channel while making information leakage and program efficiency trade-offs," 2014 IEEE 20th International Symposium on High Performance Computer Architecture (HPCA), Feb. 2014, pp. 213-224.

Shay Gueron, "A Memory Encryption Engine Suitable for General Purpose Processors," White Paper, 2013, pp. 1-14.

Simon Johnson et al., "Intel Software Guard Extensions: EPID Provisioning and Attestation Services," White Paper, 2016, pp. 1-10, Intel Corporation.

Whitfield Diffie et al., "Privacy and authentication: An introduction to cryptography," Proceedings of the IEEE, Mar. 1979, pp. 397-427, vol. 67 No. 3, IEEE.

"Breakthrough AES Performance with Intel AES New Instructions." White Paper, 2013, pp. 1-12, Intel Corporation.

Whitfield Diffie et al., "New directions in cryptography," IEEE Transactions on Information Theory, Nov. 1976, pp. 644-654, vol. 22, No. 6, IEE.

R. J. Anderson, "Security Engineering: A Guide to Building Dependable Distributed Systems; Chapter 5: Cryptography," 2008, pp. 129-184, Wiley Publishing, 2 ed.

Weidong Shi et al., "High efficiency counter mode security architecture via predictionand precomputation," Proceedings of the 32nd Annual International Symposium on Computer Architecture, ISCA '05, 2005, pp. 14-24, IEEE Computer Society, Washington, DC, USA.

G. Edward Suh et al., "Physical unclonable functions for device authentication and secret key generation," Proceedings of the 44th Annual Design Automation Conference, DAC '07, 2007, pp. 9-14, ACM, New York, NY, USA.

L. G. Valiant, "A scheme for fast parallel communication," SIAM Journal on Computing, May 1982, pp. 350-361, vol. 11, No. 2, Society for Industrial and Applied Mathematics.

John Demme et al., "Side-channel vulnerability factor: A metric for measuring information leakage," Proceedings of the 39th Annual International Symposium on Computer Architecture, ISCA '12, 2012, pp. 106-117, IEEE Computer Society, Washington, DC, USA.

(56) References Cited

OTHER PUBLICATIONS

Jung Ho Ahn et al., "McSimA+: A Manycore Simulator with Application-level+Simulation and Detailed Microarchitecture Modeling," ISPASS'13, 2013, pp. 1-12.
Milo M. K. Martin et al., "Multifacet's general execution-driven multiprocessor simulator (GEMS) toolset," SIGARCH Computer Architecture News, Sep. 2005, pp. 1-8, vol. 33.
Nan Jiang et al., "A detailed and flexible cycle-accurate network-on-chip simulator," 2013 IEEE International Symposium on Performance Analysis of Systems and Software (ISPASS), 2013, pp. 86-96, Austin, TX, USA.
John Kim et al., "Cost-efficient dragonfly topology for large-scale systems," IEEE Micro, 2009, pp. 33-40, vol. 29, No. 1, IEEE.
Dana Dachman-Soled et al., "Oblivious network ram and leveraging parallelism to achieve obliviousness," ASIACRYPT, 2017, pp. 1-29.
Elaine Shi et al., "Oblivious ram with $O((\log N)^3)$ worst-case cost," Proceedings of the 17th International Conference on the Theory and Application of Cryptology and Information Security, ASIACRYPT'11, 2011, pp. 197-214, Springer-Verlag, Berlin, Heidelberg.
David L. Chaum, "Untraceable electronic mail, return addresses, and digital pseudonyms," Communications of the ACM, Feb. 1981, pp. 84-90, vol. 24, No. 2, ACM.
Michael G. Reed et al., "Anonymous connections and onion routing," IEEE Journal on Selected Areas in Communications, May 1998, pp. 482-494, vol. 16.
Amro Awad et al., "ObfusMem: A Low-Overhead Access Obfuscation for Trusted Memories" 2017, pp. 1-13, ACM.
Shaizeen Aga et al., "InvisiMem: Smart Memory Defenses for Memory Bus Side Channel", ISCA '17, Jun. 24-28, 2017, pp. 94-106, ACM.

\* cited by examiner

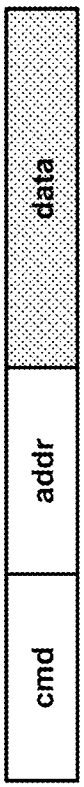
FIG. 1A
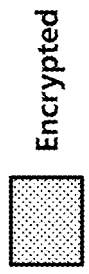
FIG. 1B

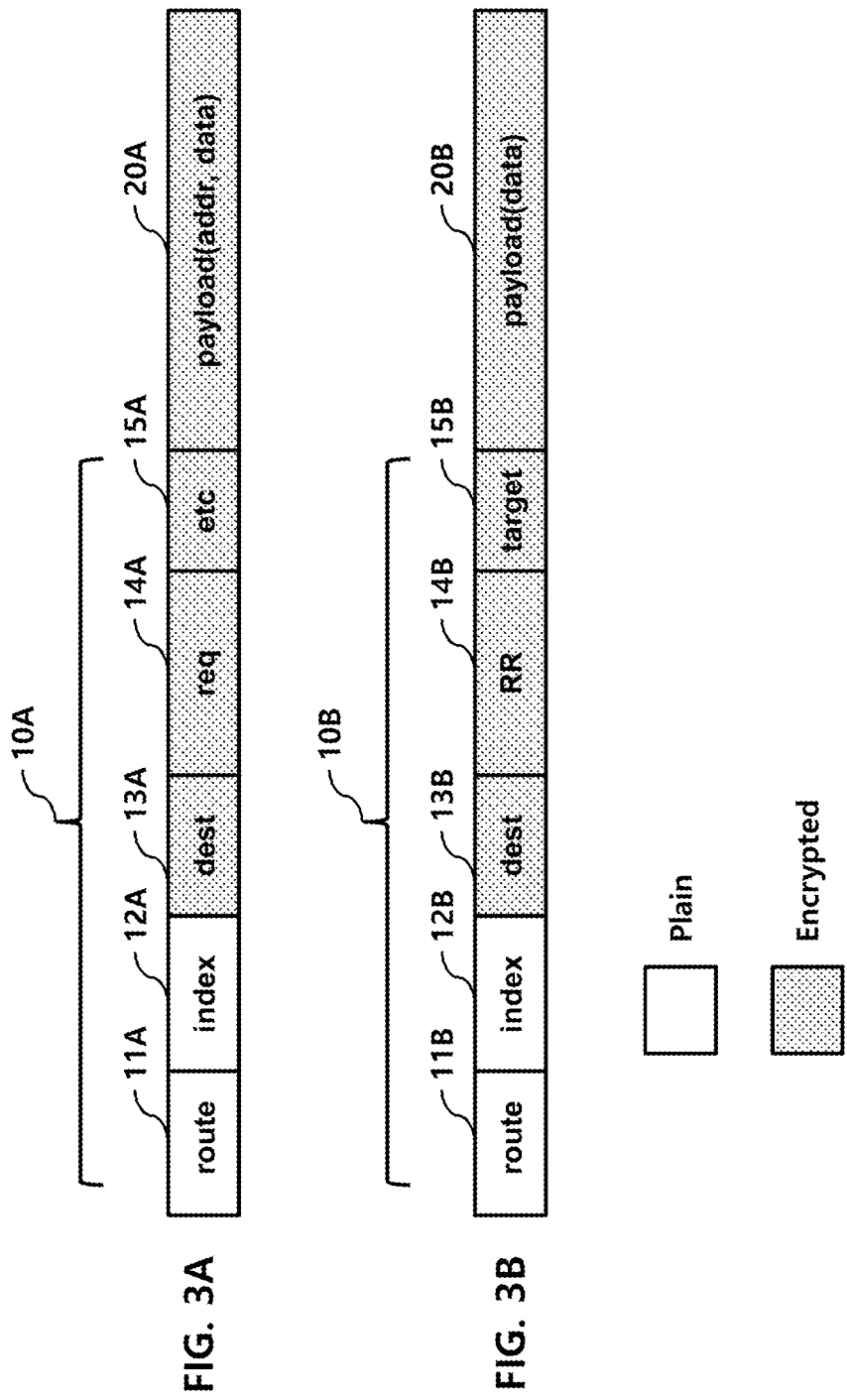

DEVICE FOR ENCRYPTING AND/OR DECRYPTING PACKETS AND METHOD FOR ROUTING PACKETS IN MEMORY NETWORK INCLUDING THE SAME

CROSS-REFERENCE TO RELATED APPLICATIONS

The present application claims priority to Korean Patent Application No. 10-2016-0174225, filed on Dec. 20, 2016, which is incorporated herein by reference in its entirety.

BACKGROUND

1. Field

Exemplary embodiments of the present disclosure relate to a device for encrypting and/or decrypting packets for security, and a method for routing packets in a memory network including the same.

2. Description of the Related Art

Computer security may be threatened by physically accessing a channel between a memory device and a host to intercept data transmitted between the host and the memory device. The host may include a memory controller or a central processing unit (CPU).

FIG. 1A illustrates a structure of a packet transmitted between a conventional host and a memory device.

Referring to FIG. 1A, the packet includes a command (cmd), an address (addr), and data. Only the data is encrypted, and the command and the address are kept as plain texts.

In this case, the data itself can be protected, but there is a risk that an access pattern to the memory device is exposed because the address and the command are kept as plain texts.

FIG. 1B illustrates a structure of a packet transmitted between a host and a memory device, which employ a conventional packet interface.

Referring to FIG. 1B, the packet includes a target node field (dest) including routing information, a request type field (R/W), other fields (etc), and a payload including an address and data. The target node field, the request type field, the other fields, and the payload are all encrypted.

In this case, the memory device receiving the packet must decrypt the packet to identify the target node.

If the target node of the decrypted packet is not a current node receiving the packet, the decrypted packet must be re-encrypted before the packet is routed to another node.

This means that the encryption and decryption processes using algorithms such as the Diffie-Hellman algorithm should be performed at every node.

Therefore, the read and write performance of the memory device may deteriorate.

Accordingly, there is a demand for technology protecting not only packet data but also an access pattern for a memory device, and also there is a demand for packet encryption technology that can minimize degradation of the read/write performance of the memory device.

SUMMARY

Various embodiments of the present disclosure are directed to a device capable of efficiently encrypting or decrypting a packet including route information by using a pre-generated one-time password (OTP) key, and directed to a routing method used in a memory network including the device.

Various embodiments of the present disclosure are directed to a routing method that can hide a target node in a memory network.

Various embodiments of the present disclosure are directed to a packet structure that prevents the leakage of contents of a packet transmitted in a memory network.

A device according to an embodiment may transmit or receive a packet in a memory network including one or more processors and/or one or more memory devices.

A device according to an embodiment may include a key storage unit configured to store a one-time password (OTP) key that is shared with a target node; an encryption unit configured to encrypt a transmission packet with the OTP key stored in the key storage unit, and to transmit the encrypted transmission packet to the target node; and a decryption unit configured to decrypt a receiving packet received from the target node with the OTP key stored in the key storage unit. The device may be a processor in the memory network or a memory device in the memory network.

A routing method according to an embodiment may set a route for a request packet at a start node in a network.

A routing method according to an embodiment may include selecting a first node to process a request, the first node is a node other than the start node and a target node of the route; selecting a passing node and an end node between the target node and the first node; setting a first path from the start node to the passing node; setting a second path from the passing node to the end node; and generating the route for the request packet by including the first path and the second path. The request may be a read or a write request and the network may include one or more processors and one or more memory devices. Each of one or more processors and one or more of memory devices may correspond to a node transmitting or receiving the request packet.

BRIEF DESCRIPTION OF THE DRAWINGS

FIG. 1A and FIG. 1B show structures of packets used in a conventional memory network.

FIGS. 3A, 3B, 4A, 4B, 5A, and 5B illustrate structures of packets provided to a device according to embodiments of the present disclosure.

DETAILED DESCRIPTION

Figure 2:
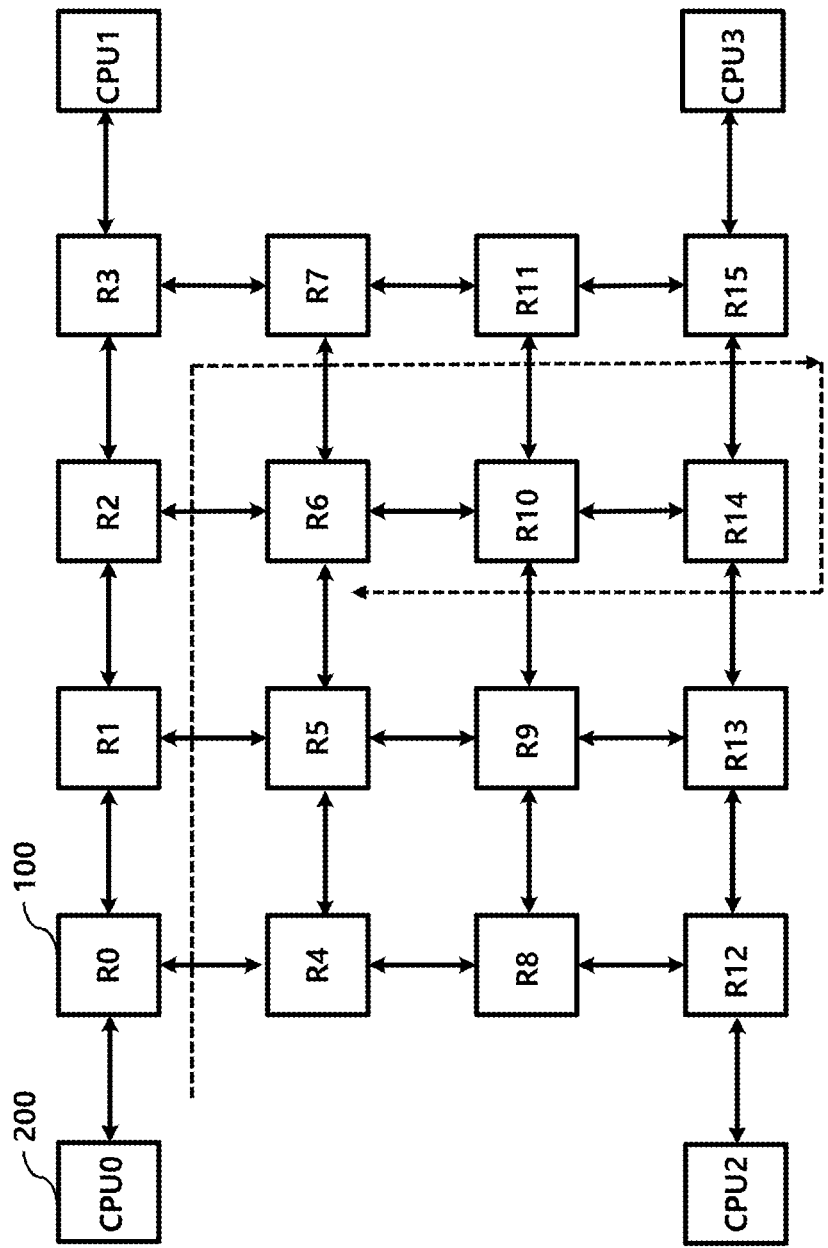
FIG. 2 illustrates a memory network and a routing method according to an embodiment of the present disclosure.

Various embodiments will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of embodiments of the claims to those skilled in the art. Throughout the disclosure, like reference numerals refer to like parts throughout the various figures and embodiments of the present disclosure.

Hereinafter, embodiments will be described with reference to the accompanying drawings.

FIG. 2 illustrates a memory network and a routing method according to an embodiment of the present disclosure.

Referring to FIG. 2, each of a plurality of CPUs 200 transmits a packet to the memory network including a plurality of memory devices 100. The packet is transmitted on a route connecting the plurality of memory device 100 within the memory network, and reaches a target memory device to process a read or write request.

The CPU 200 is an example of a processor. A graphics processing unit (GPU) may be used in another embodiment.

Hereinafter, the memory devices 100 in the memory network and the CPUs 200 each may be referred to as a node.

In this embodiment, as shown in FIG. 2, the plurality of memory devices 100 are arranged in a lattice form, each of the memory devices 100 has a link for transmitting and receiving packets to and from an adjacent memory device, and each of the plurality of CPUs 200 may have a link to a corresponding one of the memory devices 100 in the memory network.

There may be various related arts regarding a connection structure of links between the CPUs 200 and the memory devices 100 and a connection structure of links between the memory devices 100 in the memory network.

A structure of the memory network to which the present invention can be applied is not limited to the specific structure shown in FIG. 2.

FIG. 3A and FIG. 3B illustrate structures of packets transmitted in the memory network of FIG. 2 according to an embodiment.

A packet may move from the CPU 200 to the memory device 100 (hereinafter, referred to as a first direction) or may move from the memory device 100 to the CPU 200 (hereinafter referred to as a second direction). The first and second directions are opposite to each other.

For example, a packet from the CPU 200 to the memory device 100 may be referred to as a first packet. Conversely, a packet transmitted from the memory device 100 to the CPU 200 may be referred to as a second packet.

For example, when a read request packet is transmitted from the CPU 200 to the memory device 100, a data packet generated in response to the request packet is transmitted from the memory device 100 to the CPU 200. At this time, the read request packet corresponds to the first packet, and the data packet that is a response packet of the request packet, and which includes data read from the memory device 100, corresponds to the second packet.

FIG. 3A shows a structure of the first packet.

In this embodiment, the first packet includes a header 10A and a payload 20A.

The payload 20A includes at least one of an address or data, and is encrypted. Accordingly, even if the first packet is leaked, the address and data may not be leaked.

In case of a read request, only an address may be included in the payload 20A. In case of a write request, the payload 20A may include both an address and data.

The header 10A may include a route field 11A, an index field 12A, a target (or destination) field 13A, a request field 14A, and another (etc) field 15A.

In the present embodiment, the route field 11A includes unencrypted plain texts.

The route field 11A includes, as route information, information about nodes included in a first route from a start node to an end node.

In the present embodiment, when the first packet is transmitted along the first direction, the start node, that is, the CPU 200, can generate the route information of the first route.

If the route information of the first route for the read request is generated along the first direction, the end node on the first route can generate route information of a second route along the second direction based on the route information of the first route. The nodes of the second route are in reverse order to the nodes of the first route.

In the present embodiment, the route field 11A may sequentially include information about the nodes included in the first route from the start node to the end node.

According to an embodiment, when the first packet passes the nodes included in the first route, information about a node that the first packet has already passed may be deleted from the route information.

The index field 12A includes index information for selecting a one-time password (OTP) key to be used for encryption and decryption.

Encryption and decryption using an index will be described in detail below.

The index field 12A includes the index information as unencrypted plain texts.

In the header 10A, the target field 13A and the request field 14A are encrypted.

The target field 13A contains information, e.g., identification, of a memory device 100 that processes a read or write request.

In this embodiment, a target node can be any node on the first route. For example, if the nodes included in the first route are listed in order of visit along the first route, the target node may be in any position on the first route.

Since the target field 13A is encrypted, the information of the target node is not exposed to the outside even though the first packet is leaked.

In addition, even if the route information, which is transmitted as unencrypted plain texts, is leaked, it is difficult to know an access pattern to the memory device 100 since the target field 13A is encrypted and thus the target node cannot be identified.

The request field 14A may include a read or write request, which is a type of a request to be processed using the payload 20A.

Since the request field 14A is also encrypted, information on the read or write request is not exposed even if the first packet is leaked outside of a memory network.

The header 10A may further include the etc field 15. A user can specify contents included in the etc field 15.

As described above, in general, data is not included in a packet for a read request and data is included in a packet for a write request.

Thus, a length of the packet for the write request is longer than a length of the packet for the read request. Therefore, by analyzing a length of a packet, a request pattern transmitted in the memory network may be leaked.

In an embodiment, packets may be adjusted to have the same length regardless of types of requests in order to prevent the request pattern from being exposed to the outside by analyzing a length of a packet. This will be described with reference to FIGS. 4A to 5B.

FIG. 3B shows a structure of the second packet.

The second packet includes a header 10B and a payload 20B.

If the second packet is a response to a read request, the payload 20B includes data corresponding to the read request in an encrypted form.

The header 10B includes a route field 11B, an index field 12B, a target field 13B, a request field 14B, and another (etc) field 15B.

The route field 11B includes, as route information, information about nodes included in a second route from a start node to an end node.

If the second packet is the response to the read request, the end node on the second route may be the CPU 200 that issued the read request.

In this embodiment, the route information of the second packet is in reverse order to the route information of the first packet.

The index field 12B includes index information for selecting an OTP key to be used for encryption and decryption.

Encryption and decryption operations using an index will be described in detail later.

The route field 11B and the index field 12B include unencrypted plain texts.

The target field 13B includes information, e.g., identification, of a target node that will receive the second packet.

In the present embodiment, information about the next node on the second route is included in the target field 13B.

The request field 14B indicates a type of a request and is set to a specific value to distinguish a read request and a write request, such as Read Response (RR) when the second packet is generated as a response to the read request.

In the second packet, the etc field 15B includes information of a second target node, and the second target node corresponds to a node that has performed a read operation in response to the read request. The information of the second target node may be obtained from the target field 13A of the first packet shown in FIG. 3A.

Figure 4A:
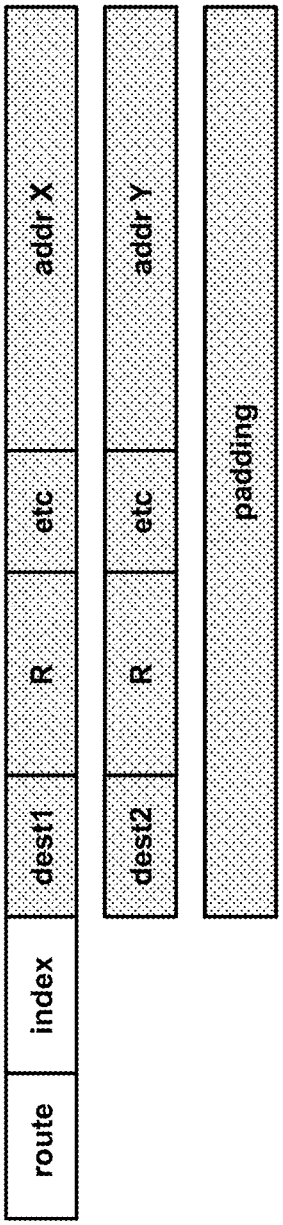
Figure 4B:
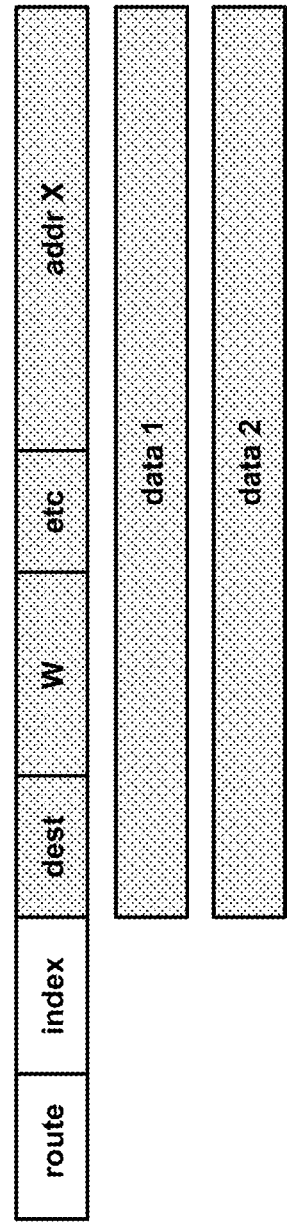

FIG. 4A and FIG. 4B are structures of packets having the same length according to an embodiment of the present disclosure.

FIG. 4A and FIG. 4B show a method of increasing a length of a read request packet considering a write request packet, which has a longer length than the read request packet.

FIG. 4B shows packet data for a write request including an address X and data (data1 and data2) to be written to a storage region corresponding to the address X.

To increase the length of the read request packet shown in FIG. 4A, padding is added to the read request packet. A length of the padding added to the read request packet corresponds to a length difference between the read request packet shown in FIG. 4A and the write request packet shown in FIG. 4B.

However, if the difference in packet length is large enough, one read request packet may contain multiple read requests before padding is added. In FIG. 4A, two read requests are included in the read request packet, and then the padding is added to the read request packet so that the read request packet has the same length as the write request packet shown in FIG. 4B.

The number of read requests to be included in one packet may be prescribed in advance according to an embodiment.

FIG. 4A is a structure of the read request packet including a first read request for an address X and a second read request for an address Y.

In FIG. 4A, a route field may include information about target nodes (dest1 and dest2) on a route from a start node to an end node.

In an embodiment, requests having a same target node may be combined to make a packet. In this case, since there is only one target node between the start node and the end node, it is easy to control the routing of the packet.

Figure 5A:
Figure 5B:
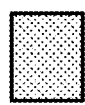

FIG. 5A and FIG. 5B illustrates structures of packets having the same length according to an embodiment of the present disclosure.

In FIG. 5A and FIG. 5B, a write request packet is adjusted in consideration of a read request packet having a shorter length than the write request packet.

FIG. 5A shows two packets each including a single read request. FIG. 5B shows multiple packets, e.g., three packets, that include a single write request. In FIG. 5B, the single write request is divided into three parts, which are respectively distributed to the three packets.

In FIG. 5B, an etc field 15C of each packet includes a sequence 151 and a request ID 152.

Since the three parts of the single write request are distributed to the three packets, a node receiving the write request should collect the three packets to obtain the entire write request.

The request ID 152 is assigned a different number for each of the distributed parts of the write request to identify each of the distributed parts of the write request.

The sequence 151 indicates the order of the three packets that combines the parts to obtain the write request.

Figure 6:
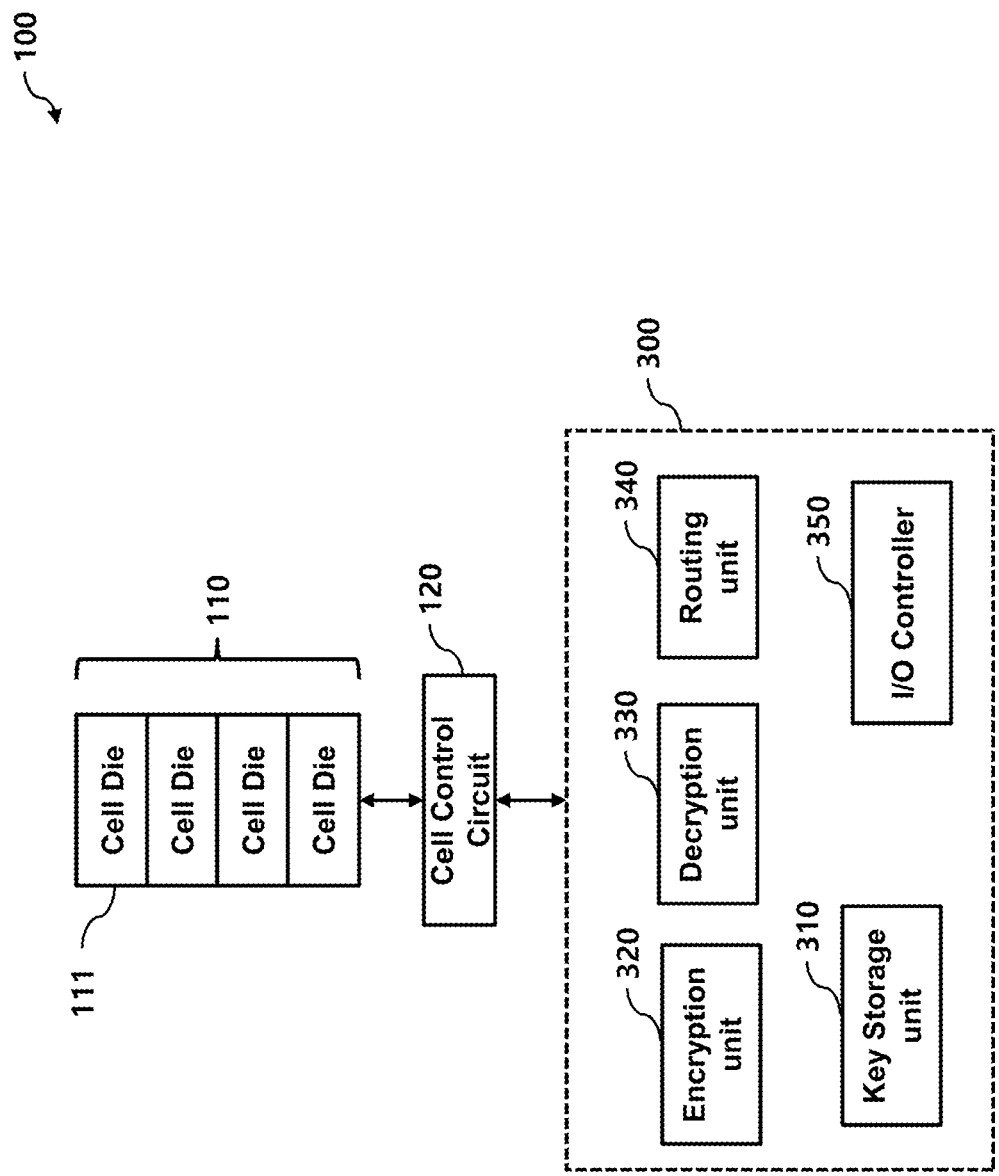
FIG. 6 illustrates a memory device according to an embodiment of the present disclosure.

FIG. 6 illustrates a block diagram of a memory device 100 of FIG. 2 according to an embodiment of the present disclosure.

The memory device 100 may be implemented using a Hybrid Memory Cube (HMC), but is not limited thereto.

In this embodiment, the memory device 100 includes a cell array 110, a cell control circuit 120, and a packet control circuit 300.

The cell array 110 may include a plurality of cell dies 111 that are stacked.

The cell control circuit 120 controls read and write operations for the cell array 110.

The packet control circuit 300 controls transmission/reception of a packet.

The cell control circuit 120 and the packet control circuit 300 may be formed in a single logic die.

In an embodiment, the plurality of cell dies 111 and the logic die may be vertically stacked, and they can transmit and receive signals through a Through Silicon Via (TSV).

In this embodiment, the packet control circuit 300 includes a key storage unit 310, an encryption unit 320, a decryption unit 330, a routing unit 340, and an I/O controller 350.

The key storage unit 310 stores an OTP key used for encryption and decryption of a packet.

The encryption unit 320 encrypts one or more fields in a packet using the OTP key stored in the key storage unit 310. The decryption unit 330 decrypts encrypted fields in the packet using the OTP key stored in the key storage unit 310.

The routing unit 340 controls operations for transmitting and receiving packets to and from the CPU 200 of FIG. 2 or another memory device 100 of FIG. 2. The routing unit 340 may generate route information.

The I/O controller 350 includes a physical interface circuit that performs transmission and reception of a packet.

Figure 7:
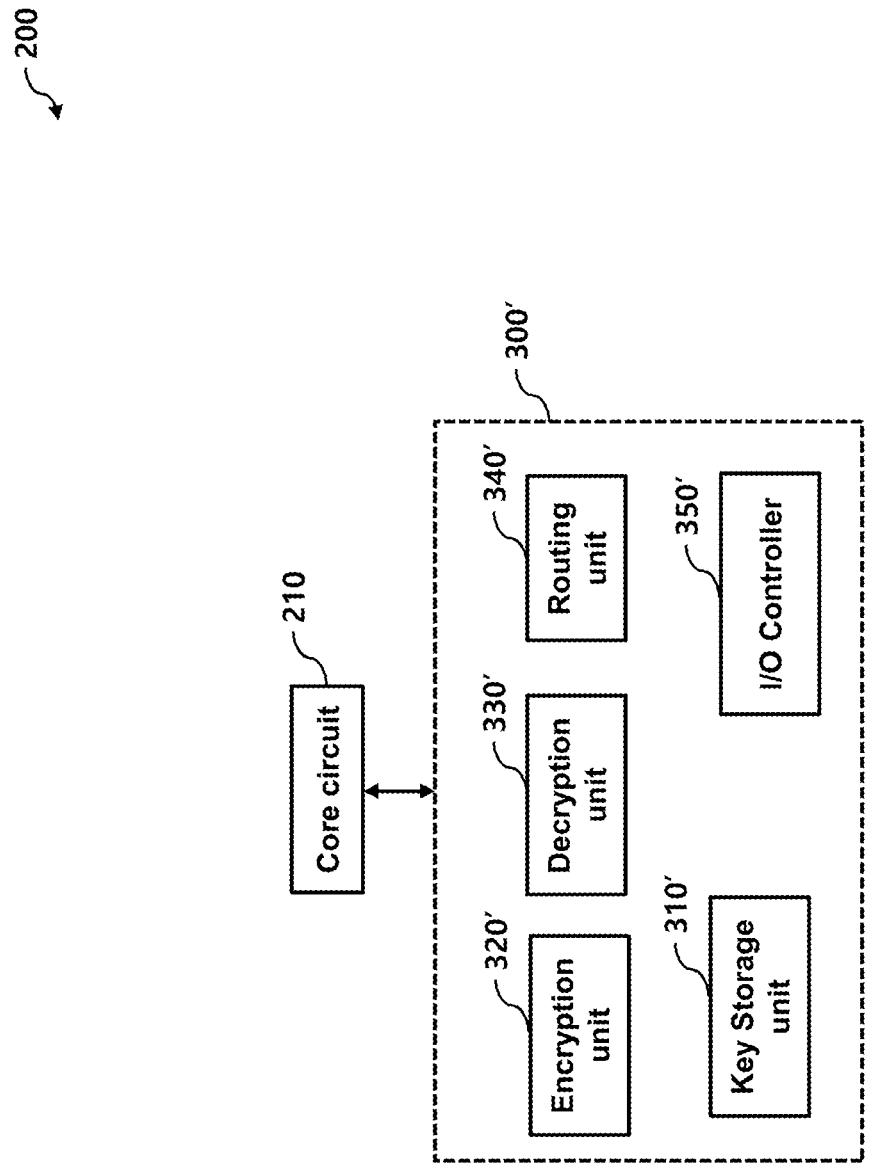
FIG. 7 illustrates a CPU according to an embodiment of the present disclosure.

FIG. 7 illustrates a block diagram of a CPU 200 of FIG. 2 according to an embodiment of the present disclosure.

The CPU 200 includes a core circuit 210 and a packet control circuit 300'.

The core circuit 210 generates a request to the memory device 100 and receives a response to the request from the memory device 100.

The packet control circuit 300' includes an encryption unit 320', a decryption unit 330', a routing unit 340', a key storage unit 310', and an I/O controller 350'.

The packet control circuit 300' corresponds to the packet control circuit 300 included in the memory device 100 of FIG. 6, and may have substantially the same configuration as the packet control circuit 300. The packet control circuit 300' controls transmission/reception of a packet.

Figure 8:
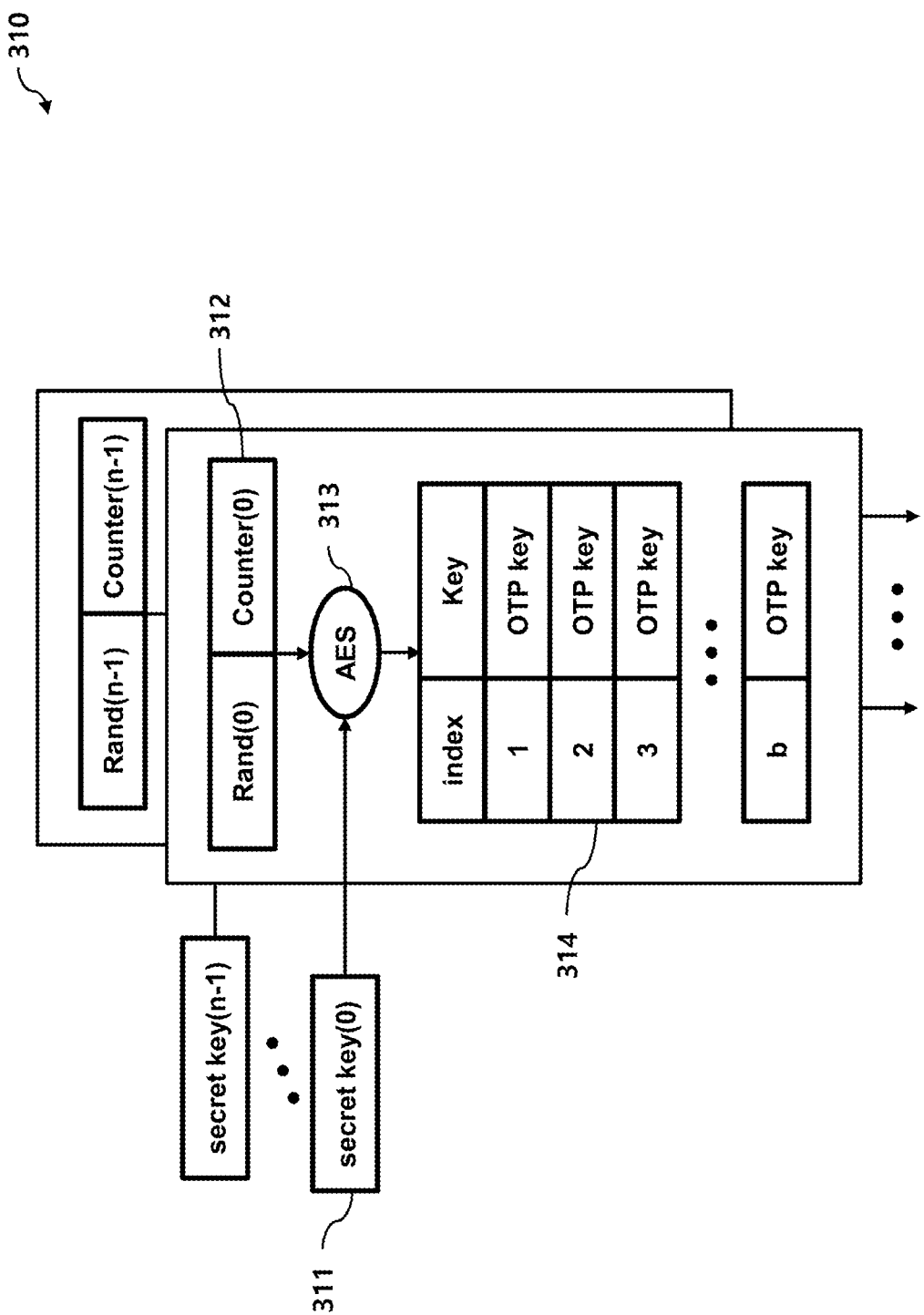
FIG. 8 illustrates a key storage unit according to an embodiment of the present disclosure.

FIG. 8 illustrates a block diagram of a key storage unit 310 of FIG. 6 according to an embodiment of the present disclosure.

Assuming that the total number of nodes in a route is n (n is a natural number greater than 2), and that the key storage unit 310 of FIG. 8 is included in an i-th node (i is any one of 0 to n−1).

The key storage unit 310 includes a secret key storage unit 311, a seed generation unit 312, a first operation unit 313, and an OTP key storage unit 314.

The secret key storage unit 311 stores a secret key.

The secret key is a key generated based on a private key of the i-th node and a public key of a j-th node (j is any of 0 to n−1 except i), using a key exchange algorithm such as the Diffie-Hellman algorithm.

Accordingly, the secret key storage unit 311 stores n−1 secret keys.

Since the Diffie-Hellman algorithm is well known, a detailed description thereof is omitted.

In this embodiment, the i-th node corresponds to a current node in the route, and the j-th node corresponds to a next node in the route.

The seed generation unit 312 of the i-th node, i.e., the current node, may include a random number storage unit for storing a random number and a counter for outputting a counter value. The i-th node shares the random number with the j-th node.

Since there are n−1 nodes except the i-th node in the route, the seed generates unit 312 includes n−1 random numbers corresponding to the n−1 nodes, respectively, and outputs n−1 different seeds.

A seed is generated by combining the random number and the counter value. For example, the seed may be generated by placing the counter value after the random number.

When either the random number or the counter value changes, a value of the seed also changes.

The counter value is incremented each time a new OTP key is generated. If the counter value reaches a maximum value, the random number shared by the two nodes is changed, and the counter value is initialized.

The first operation unit 313 generates an OTP key based on a j-th secret key and a j-th seed. The j-th secret key is a secret key corresponding to the j-th node, and is among the n−1 secret keys stored in the secret key storage unit 311. The j-th seed is a seed corresponding to the j-th node, and is among the n−1 seeds generated by seed generates unit 312.

In the present embodiment, the first operation unit 313 generates an OTP key by applying the AES (Advanced Encryption Standard) algorithm to a secret key and a seed.

A large amount of time is consumed for performing the operation of the first operation unit 313. Accordingly, in the present embodiment, the OTP key is generated in advance and stored in the OTP key storage unit 314.

The OTP key storage unit 314 stores a plurality of pre-generated OTP keys.

In FIG. 8, the key storage unit 310 of the i-th node stores a multiplicity of OTP keys for each j-th node.

For example, the OTP key storage unit 314 of the i-th node stores the multiplicity of OTP keys that can be used with the j-th node, and an OTP key storage unit of the j-th node stores the same number of OTP keys that can be used with the i-th node.

Each of the multiplicity of OTP keys is selected by an index. An index used to select an OTP key for the j-th node from the OTP key storage unit 314 included in the i-th node is the same as an index used to select an OTP key for the i-th node from the OTP key storage unit included in the j-th node.

The OTP key storage unit 314 may sequentially use indices according to a predetermined rule, and may indicate the last-used index. In this case, if the last-used index is the final one, which is b in FIG. 8, the first index may be used again.

The OTP key storage unit 314 may further include a field indicating whether a corresponding OTP key is used or not in other embodiments.

An OTP key that has been previously used, may not be used again in the embodiment. Therefore, a new OTP key may be generated to replace the used OTP key.

The OTP key generation may be performed immediately or in a predetermined time after the OTP key has been used.

In this embodiment, in order to reduce an encryption time and a decryption time, it is preferable to generate a new OTP key before all OTP keys stored in the OTP key storage unit 314 have been used.

Nevertheless, when performing an encryption operation, if an OTP key is depleted, a new OTP key should be generated prior to performing the encryption operation. It is desirable to prevent the depletion of the OTP key from happening for better performance.

When generating a new OTP key, the counter value is incremented to generate a new seed, and the result of the AES operation on the new seed and a secret key may be stored as a new OTP key.

If a current counter value has the maximum value, a new random number is generated and the counter value is initialized, thereby generating a new seed. After that, a new OTP key is generated using the new seed and a secret key.

If a new OTP key is generated for the j-th node in the i-th node, information about the new OTP key should be shared by the j-th node.

Accordingly, when at least one of the random number and the counter value changes and thus a new OTP key is generated, an index for the new OTP key and the new OTP key should be exchanged between the i-th node and the j-th node. The exchange of information between the i-th node and the j-th node can be carried out using a separate bus.

Figure 9:
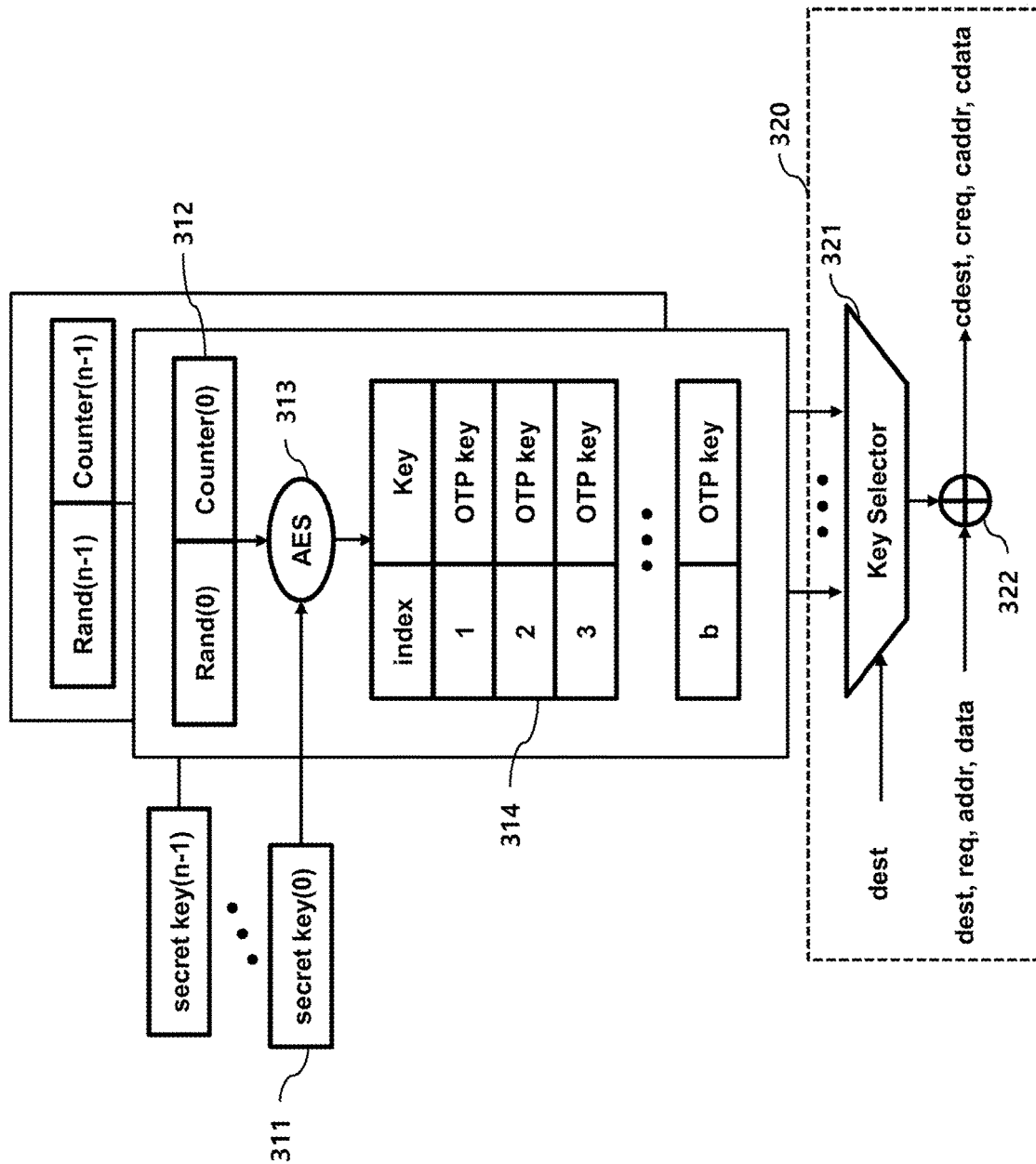
FIG. 9 illustrates an encryption unit according to an embodiment of the present disclosure.

FIG. 9 illustrates a block diagram of the encryption unit 320 of FIG. 6 according to an embodiment of the present disclosure.

The encryption unit 320 includes a key selector 321 and a second operation unit 322. The key selector 321 selects one of a plurality of OTP keys in accordance with target node information (dest). The second operation unit 322 combines a selected OTP key and information to be encrypted, such as information about a target node, a request, an address, and data.

An OTP key may be selected by using index information stored in a packet.

In another embodiment, if the target node is the j-th node, an OTP key may be selected by using a next index of the lastly used index in the OTP key storage unit 314 corresponding to the j-th node.

In this embodiment, the second operation unit 322 performs an XOR operation on the selected OTP key and the information to be encrypted.

Since the encryption unit 320 only performs an XOR operation by selecting a pre-generated OTP key, it takes a very short time to perform the encryption operation.

Figure 10:
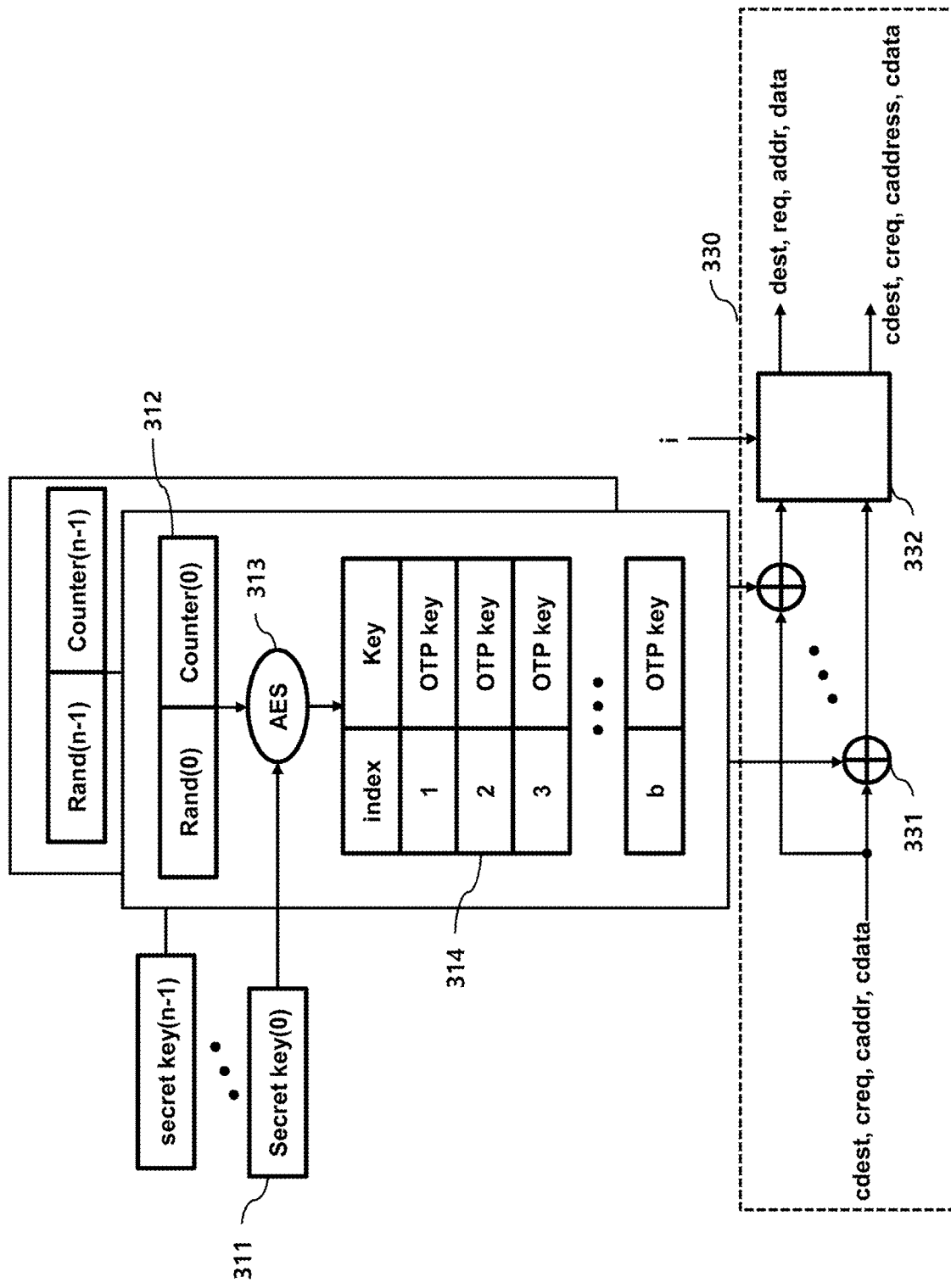
FIG. 10 illustrates a decryption unit according to an embodiment of the present disclosure.

FIG. 10 illustrates a block diagram of the decryption unit 330 of FIG. 6 according to an embodiment of the present disclosure.

The decryption unit 330 obtains n−1 OTP keys corresponding to n−1 nodes from the OTP key storage unit 314 by referring to index information included in a received packet.

The decryption unit 330 includes a third operation unit 331 that performs an operation with each of the n−1 OTP keys and encrypted information (e.g., information about a target node, a request, an address, and data) of the received packet.

In this embodiment, the third operation unit 331 performs an XOR operation on each of the n−1 OTP keys and the encrypted information.

The decryption unit 330 further includes a target determining unit 332 that compares target node information obtained by the decryption of the third operation unit 331 with current node information i.

If a current node is the target node for a read/write operation, the target determining unit 332 provides the decrypted information (e.g., information about the request, the address, and the data) to, e.g., the cell control circuit 120 of FIG. 6 to control the read/write operation for the cell array 110 of FIG. 6.

If the current node is not the target node, the target determining unit 332 controls, e.g., the routing unit 340 of FIG. 6 to route the received packet to the next node.

Figure 11:
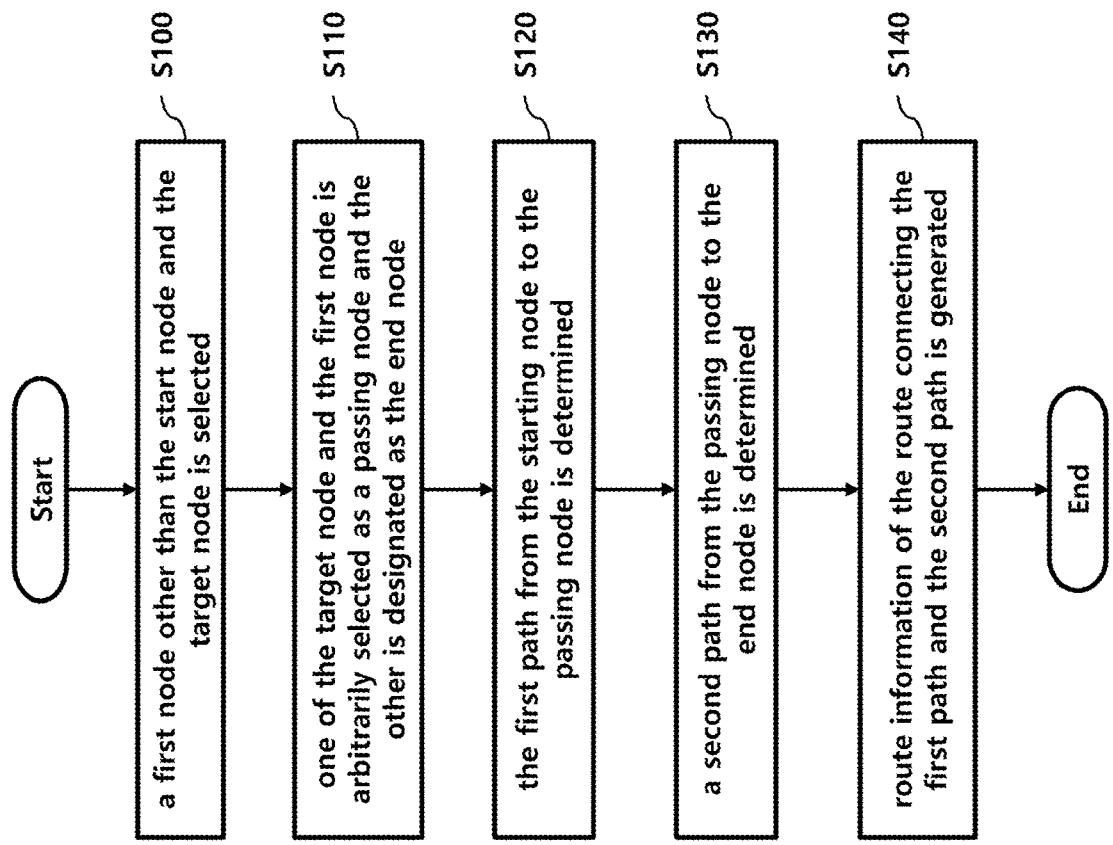
FIG. 11 is a flowchart illustrating a method for generating route information according to an embodiment of the present disclosure.

FIG. 11 is a flowchart illustrating a routing method according to an embodiment of the present disclosure.

In this embodiment, even if route information of a route is leaked, the position of a target node is not exposed.

To do this, the target node is located at an arbitrary position in the route. For example, the target node may be an end node of the route, or may be located on the route between a start node and the end node.

The route information for a read or write request can be generated by a CPU 200. In this case, it can be understood that FIG. 11 shows an operation sequence of the routing unit 340' of the CPU 200.

At this time, the start node becomes the CPU 200.

First, a first node other than the start node and the target node is selected at S100. At this time, the first node can be arbitrarily selected.

After that, one of the target node and the first node is arbitrarily selected as a passing node and the other is designated as the end node at S110. Accordingly, in some cases, the target node may be the end node, and in some cases, the target node may be the passing node.

Thereafter, a first path from the starting node to the passing node is determined at S120.

Next, a second path from the passing node to the end node is determined at S130.

Then, the route information of the route connecting the first path and the second path is generated at S140.

FIG. 2, for example, shows an example of a route in which the start node is CPU0, the target node, which is a passing node, is R15, and the end node is R6.

Figure 12:
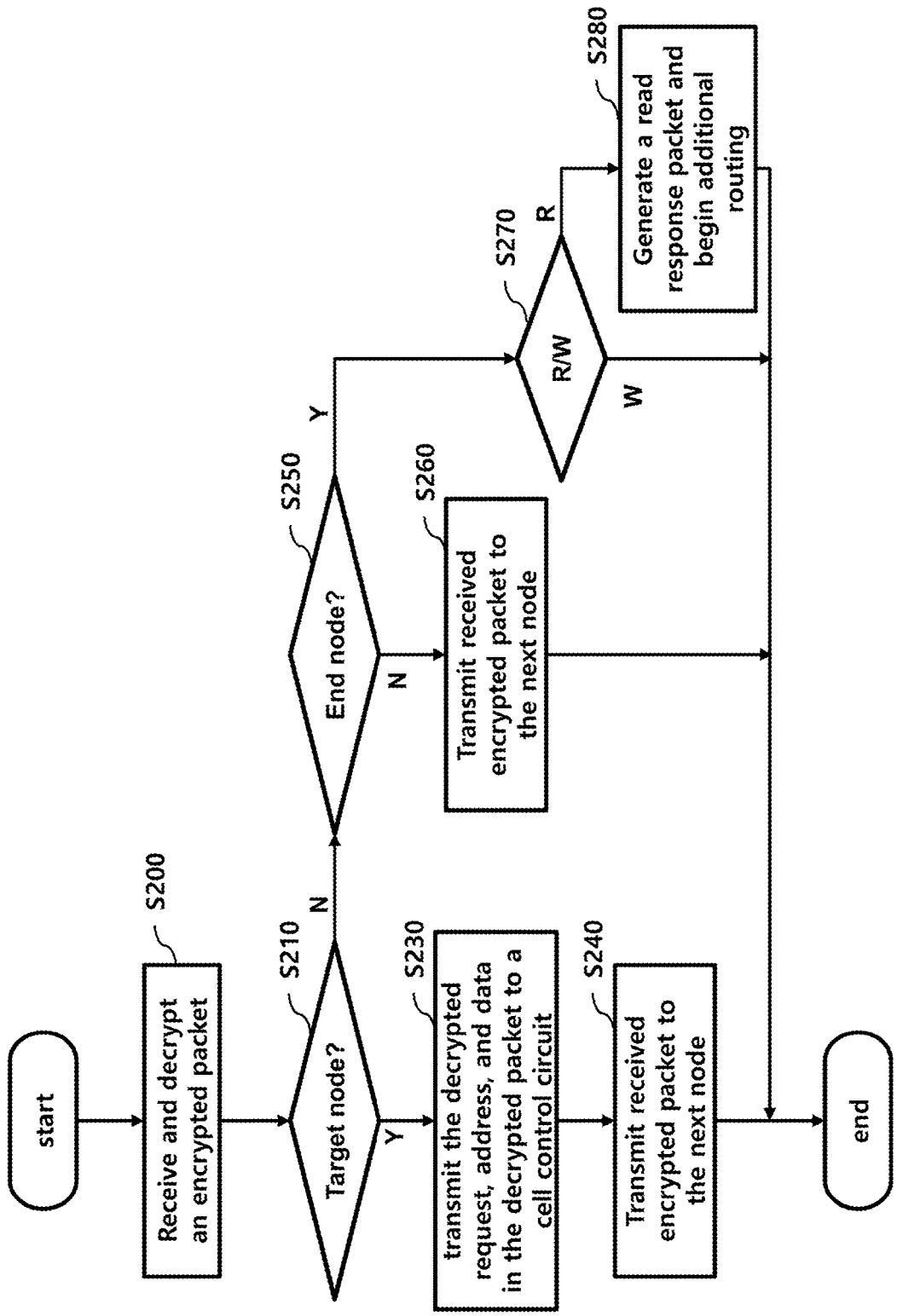
FIG. 12 is a flowchart illustrating a read or write operation of a memory device according to an embodiment of the present disclosure.

FIG. 12 is a flowchart illustrating a read or write operation of a memory device according to an embodiment of the present disclosure.

The memory device receives an encrypted packet and decrypts the received encrypted packet at S200.

The memory device determines whether a current node is a target node by referring to target node information in the decrypted packet at S210.

If the current node is the target node, the memory device transmits the decrypted request, address, and data in the decrypted packet to a cell control circuit at S230.

Then, the memory device transmits the received encrypted packet to the next node at S240. This corresponds to performing additional routing using the second path from the target node to the end node, as described with reference to FIG. 11.

If the current node is not the target node, it is determined whether the current node is an end node at S250.

If the current node is not the end node, the memory device transmits the received encrypted packet to the next node at S260.

If the current node is the end node, it is determined whether the request is a read or write request at S270.

If the request is a write request, the process ends. If the request is a read request, a read response packet is generated and additional routing begins at S280.

At this time, the read response packet corresponds to the second packet transmitted from the memory device to a CPU, as described above with reference to FIG. 3B.

In this embodiment, route information of the read response packet has the reverse order of route information for the read request that is included in the received encrypted packet.

For the read response packet transmitted along the second direction from the memory device to the CPU, a target node information is included in the target field 13B in FIG. 3B is set to information of the next node, and index information included in the index field 12B in FIG. 3B is set to an index shared with the next node each time the current node is changed.

The read response packet further includes, in the etc field 15B of FIG. 3B, information regarding a second target node that has performed a read operation in response to the read request.

That is, in the read response packet transmitted along the second direction from the memory device to the CPU, the target field 13B of FIG. 3B includes information of the next node to which the read response packet is transmitted by the current node, and the etc field 15B of FIG. 3B includes information of the CPU that issued the read request.

Data output as a result of a read operation performed in response to the read request is stored in the payload field 20B of FIG. 3B.

Figure 13:
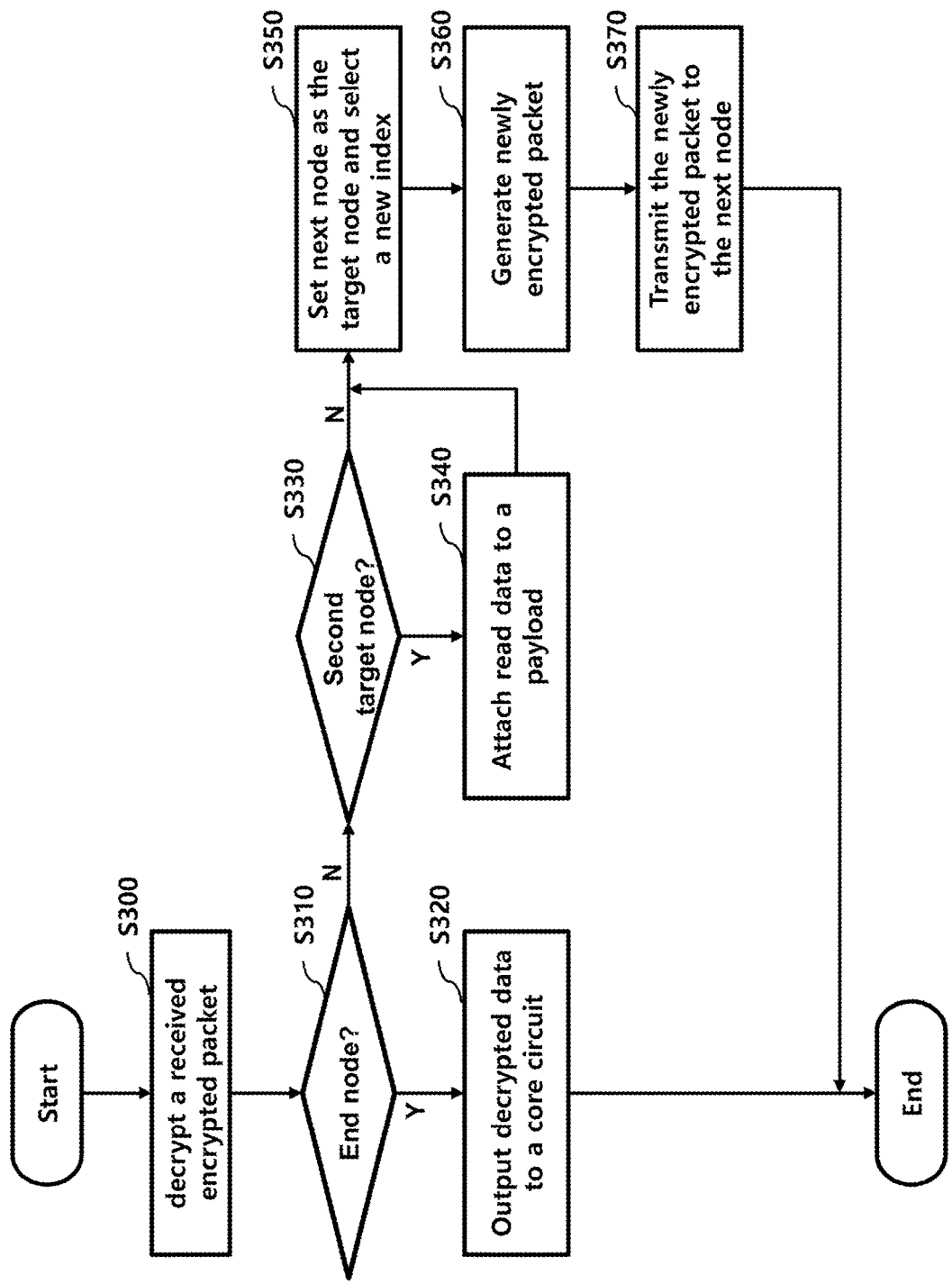
FIG. 13 is a flowchart illustrating a read response operation according to an embodiment of the present disclosure.

FIG. 13 is a flowchart illustrating a read response operation according to an embodiment of the present disclosure.

First, the memory device decrypts a received encrypted packet that corresponds to a read response packet at S300. In this case, since a current node receiving the encrypted packet is always a target node of the read response packet, desired information is output by decrypting the encrypted packet.

Then, it is determined whether the current node is an end node at S310. At this time, the end node may correspond to a CPU which issued a read request. Therefore, when the current node is determined to be the end node, the decrypted data is output to a core circuit of the CPU at S320 and the process ends.

If the current node is not the end node, it is determined whether the current node is a second target node that has performed a read operation in response to the read request at S330.

If the current node is the second target node, read data output from the current node is attached to a payload at S340 and the process proceeds to S350.

Thereafter, the next node is set as a target node of the read response packet to which the read data of the current node is attached, and a new index is selected for encryption and decryption at the next node at S350.

If it is determined at S330 that the current node is not the second target node, the process proceeds to S350.

Thereafter, the current node generates a newly encrypted packet to include the payload, the target node, and the index determined as described above at S360, and the newly encrypted packet is transmitted to the next node at S370.

Figure 14:
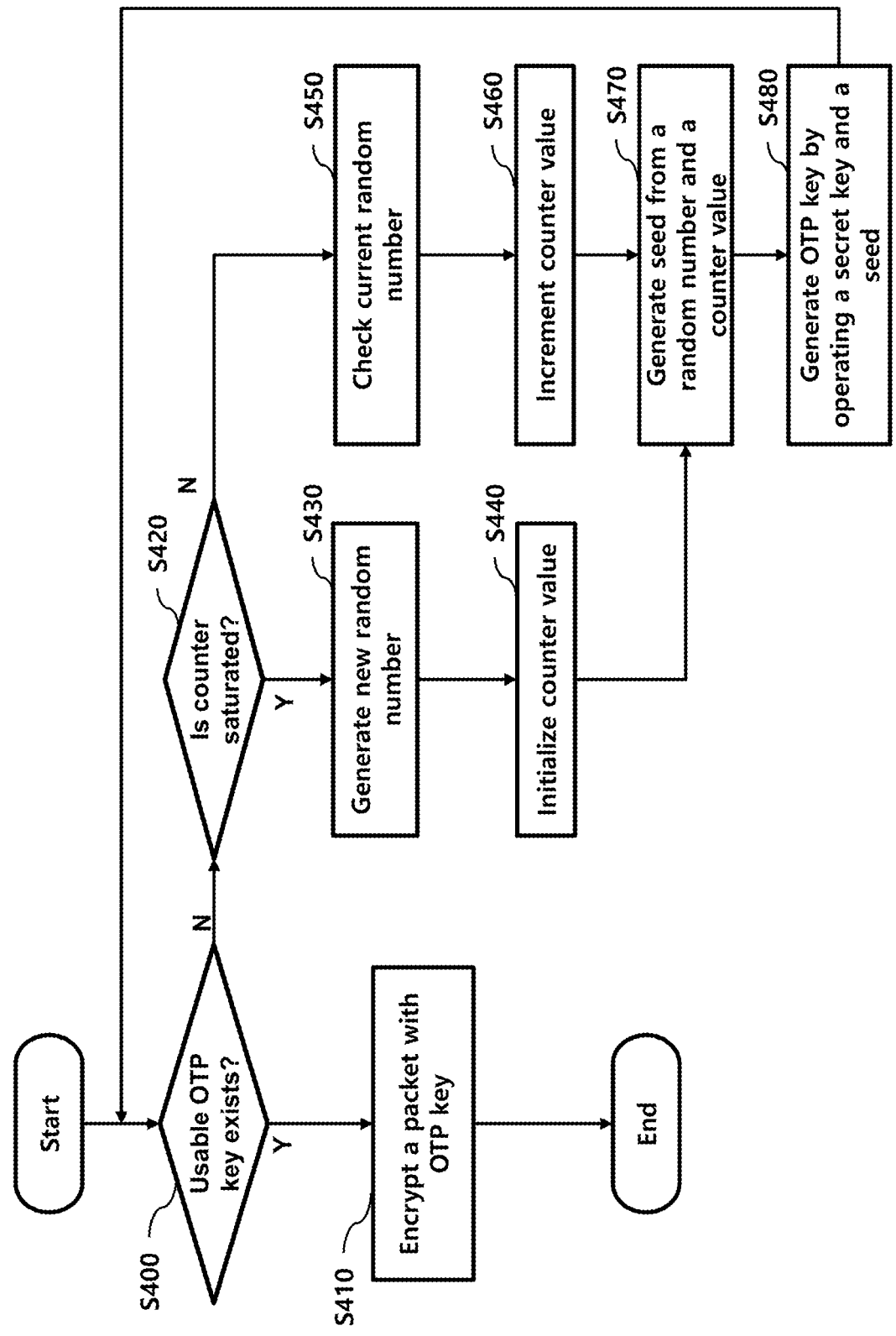
FIG. 14 is a flowchart illustrating an encryption operation of a memory device according to an embodiment of the present disclosure.

FIG. 14 is a flowchart illustrating an encryption operation of a memory device according to an embodiment of the present disclosure.

First, it is determined whether a usable OTP key exists in a key storage unit of the memory device at S400.

If a usable OTP key exists, a packet is encrypted using the OTP key at S410.

If there is no available OTP key, it is determined whether a counter in the key storage unit is saturated at S420.

If the counter is saturated, i.e., if a count value of the counter reaches a maximum value, a new random number is generated at S430 and the counter value is initialized at S440. Thereafter, the process proceeds to S470.

If the counter is not saturated, the current random number is checked at S450, and the counter value is incremented at S460.

Thereafter, a seed is generated from the random number and the counter value at S470, and a new OTP key is generated using a secret key and the seed at S480.

As described above, in the present embodiment, it is preferable that the OTP key is prepared in advance and stored in an OTP key storage unit before starting the encryption operation.

Also, when a random number is newly generated, a counter value is changed, or a new OTP key is generated, corresponding index information should be shared between a current node and a next node.

Although various embodiments have been described for illustrative purposes, it will be apparent to those skilled in the art that various changes and modifications may be made without departing from the spirit and scope of the invention as defined in the following claims.

What is claimed is:

1. A device configured to transmit or receive a packet in a memory network including one or more processors and one or more memory devices, the device comprising:

a logic die including a packet control circuit that is configured to:
store a one-time password (OTP) key that is shared with a target node;
encrypt a transmission packet with the OTP key, and transmit the encrypted transmission packet to the target node, the transmission packet including index information for selecting the OTP key; and
decrypt a receiving packet received from the target node with the OTP key stored in the logic die,
wherein the device is one of the one or more processors in the memory network or one of the one or more memory devices in the memory network,
wherein the transmission packet is encrypted by logically combining the transmission packet and the OTP key,
wherein the packet control circuit is configured to generate the OTP key by combining a secret key and a seed,
wherein the seed is generated by combining a random number and a counter value, the random number being shared between the device and the target node, and
wherein the secret key is generated based on a private key of the device and a public key of the target node.

2. The device of claim 1, wherein the packet control circuit is configured to:
store the secret key shared between the device and the target node;
generate the seed shared between the device and the target node;
generate a plurality of OTP keys including the OTP key by combining the secret key and the seed; and
store the plurality of OTP keys.

3. The device of claim 2, wherein an Advanced Encryption Standard (AES) operation is performed to generate the plurality of OTP keys.

4. The device of claim 2, wherein each of the plurality of OTP keys is identified by an index, and
wherein the device and the target node select a same OTP key with a same index.

5. The device of claim 1, wherein the packet control circuit is configured to select the OTP key that is shared with the target node, among a plurality of OTP keys.

6. The device of claim 1, wherein the packet control circuit is configured to decrypt the receiving packet by combining the receiving packet with each of a plurality of OTP keys.

7. The device of claim 6, wherein the receiving packet includes index information, and the plurality of OTP keys are selected using the index information.

8. The device of claim 6, wherein the packet control circuit is configured to determine whether identification information corresponding to the device exists in results of decrypting the receiving packet.

9. The device of claim 1, wherein each of the transmission packet and the receiving packet comprises a route field including route information of a route from a start node to an end node, and
wherein the target node is located on the route.

10. The device of claim 9, wherein each of the transmission packet and the receiving packet further comprises an index field that stores the index information for selecting the OTP key.

11. The device of claim 10, wherein the route field and the index field are not encrypted.

12. The device of claim 11, wherein each of the transmission packet and the receiving packet further comprises a target field including information of the target node, the target field being encrypted.

13. The device of claim 12, wherein each of the transmission packet and the receiving packet further comprises a field including at least one of a request type, an address, and data, the field being encrypted.

14. The device of claim 1, wherein, when the device is a memory device, the device further comprises a cell array and a cell control circuit configured to control the cell array, and
wherein the cell control circuit controls a read or write operation of the cell array based on a read or write request and an address obtained by decrypting the receiving packet that is destined to the target node.

15. The device of claim 14, wherein the packet control circuit is configured to transmit the receiving packet to a next node when the device is not a target node of the receiving packet.

16. The device of claim 1, wherein, when the device is a processor, the device further comprises a core circuit configured to generate a read request or a write request to be transmitted to a memory device that is a target node of the transmission packet.

17. The device of claim 16, wherein the packet control circuit is configured to set a route through which the transmission packet is transmitted.

18. A routing method for setting a route for a request packet at a start node in a network, the method comprising:

selecting a first node to process a request, the first node being a node other than the start node and a target node of the route;
selecting one of the target node and the first node as a passing node and designating the other one of the target node and the first node as an end node in order to hide where the target node is located in the route, the passing node being disposed between the start node and the end node in the route;
setting a first path from the start node to the passing node;
setting a second path from the passing node to the end node; and
generating the route for the request packet by including the first path and the second path,
wherein the request is a read or write request, and
wherein the network includes one or more processors and one or more memory devices, each of the one or more processors and one or more memory devices corresponding to a node transmitting or receiving the request packet.

19. The routing method of claim 18, wherein, when the start node corresponds to a processor, the target node corresponds to a memory device.

20. The routing method of claim 18, wherein the end node corresponds to a memory device.

* * * * *